Sept. 23, 1958
J. E. EITEL
2,853,099
VALVE OPERATING MECHANISM FOR
CONTROLLING THE FLOW OF FLUID
Filed Dec. 17, 1951
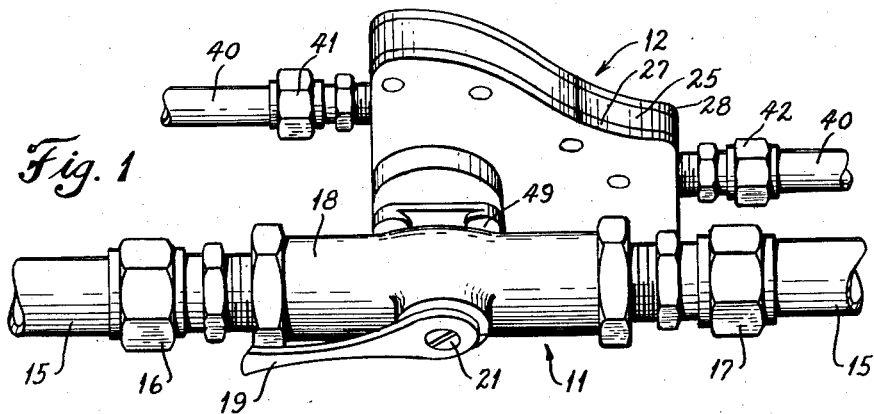
Fig. 1
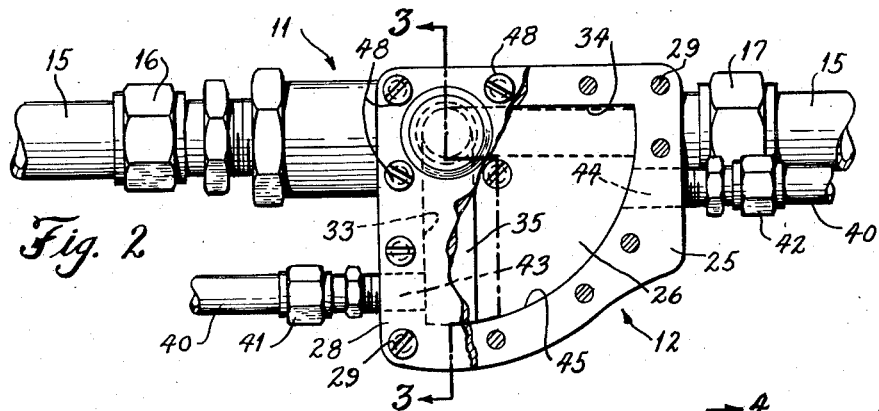
Fig. 2
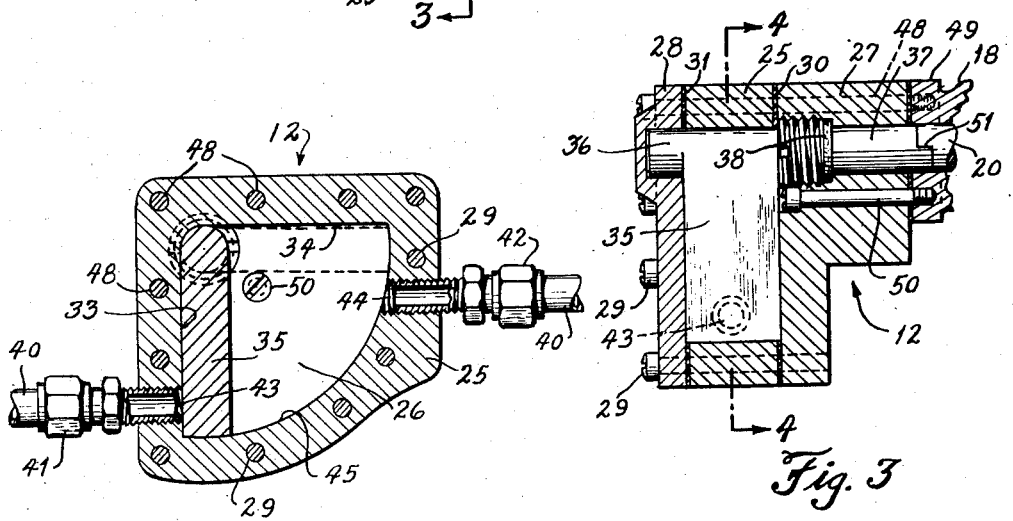
Fig. 4
Fig. 3
INVENTOR.
JOHN E. EITEL
BY
Roderick B. Jones
ATTORNEYS

2,853,099

VALVE OPERATING MECHANISM FOR CONTROLLING THE FLOW OF FLUID

John E. Eitel, Beachwood, N. J.

Original application May 29, 1946, Serial No. 673,031. Divided and this application December 17, 1951, Serial No. 262,141

1 Claim. (Cl. 137—527.2)

(Granted under Title 35, U. S. Code (1952), sec. 266)

The invention described herein may be manufactured and used by or for the Government of the United States of America for governmental purposes without the payment of any royalties thereon or therefor.

This is a division of my copending application, Serial No. 673,031, filed May 29, 1946, which is now abandoned.

The present invention pertains to the art of controlling the flow of fluid in a fluid line, and is directed to a valve structure comprising a motor for operating a fluid-control valve. The valve that is operated by the motor may be a conventional prior-art valve.

The present invention is disclosed in a fluid system, which constitutes the subject matter of the above referred to parent application. The fluid system of the parent disclosure controls the flow of fluid in one line when flow is instituted in another and different fluid line. More specifically, the invention is a safety device for controlling a fire hazard. Accordingly, in the specific application of the present invention as disclosed, the motor is in a line of fire-extinguisher fluid and operates to shut off a fuel supply line when a fire occurs, the shut off being accomplished by the operation of turning on the line of fire-extinguishing fluid.

The motor comprises a gate that is operable in the cavity of the motor body, the cavity forming a passage through the motor that is in the line of fire-extinguisher fluid. The gate is positioned in the path of fluid flowing through the passage of the motor cavity and is actuated thereby. The gate is coupled with the rotor of a fuel-line valve, which may be the fuel-control valve conventionally present. The gate is so connected with the rotor of the fuel valve that it turns off the fuel supply automatically when the gate is actuated by the fire-extinguishing fluid being turned on.

For a fuller understanding of the principles of the present invention, and for disclosure of one practical embodiment thereof, attention is directed to the accompanying drawing, in which Fig. 1 is a perspective of valve structure embodying the present invention, viewed from one side thereof, Fig. 2 is an elevation of the valve structure of Fig. 1 viewed from the opposite side, parts being broken away for clearness of illustration, Fig. 3 is a fragmentary cross-sectional elevation taken on line 3—3 of Fig. 2, and Fig. 4 is a cross-sectional elevation taken on line 4—4 of Fig. 3.

The valve structure of the invention comprises the valve 11, which may be a conventional prior-art valve, and a motor 12 secured thereto and coupled thereto in a manner to operate the valve 11 to closed condition.

The valve 11 is in the fluid line 15, being coupled thereto by the inlet coupling 16 and the outlet or exhaust coupling 17. The line 15, for example, may be a fuel line, which supplies an internal-combustion engine for example, the internal combustion engine being located somewhere beyond the coupling 17 from valve 11 along the line 15.

The valve 11 may be the common and conventional flow-control valve of such a fuel line as 15, and comprises the body 18 containing a rotor, not seen, that is movable by means of handle 19 to open or close the line 15 to respectively institute or shut off flow of fuel through the line 15. In accordance with common practice, the rotor of valve 11 is the rotary type with a quarter turn between open and closed positions, and comprises the stem 20, Fig. 3, to which the handle 19 is secured by means of screw 21 for example, Fig. 1.

The motor 12 comprises a body constituting the intermediate or core panel 25 which contains the perforation 26, and the side panels, 27 and 28, respectively front and back in Fig. 1. The several panels 25, 27 and 28 are secured together by means of screws 29 and 48 to enclose the perforation 26, which thereby constitutes a cavity in the body 25, 27, 28 of motor 12. Gaskets 30 and 31 seal the cavity 26.

In addition to the opposite side walls provided by the back and front panels 27 and 28, the cavity 26 comprises the end walls 33 and 34 which are disposed at right angles to each other. The rectangular gate or vane 35 constitutes the rotor of motor 12, spans or dams the space between the side walls of panels 28 and 27, and comprises trunnion pintles 36 and 37, from which the vane extends in a plane of the common axis of the trunnion pintles. Side panels, 28 and 27 provide bearings for respective pintles 36 and 37 as seen in Fig. 3, on which vane 35 swings between its extreme positions seen in Figs. 2 and 4. The axis of the trunnion pintles, 36 and 37 is located adjacent the intersection of the end walls 33 and 34, which determine the range of movement of vane 35 from its extreme position at the inlet end of cavity 26 against the end wall 33, which is shown in full lines in Figs. 2 and 4 to its extreme position at the outlet end of cavity 26 against the end wall 34, which is shown in dotted lines in Figs. 2 and 4.

End wall 33 is contoured to match the trailing face of vane 35 travelling towards its dotted-line position, which fits against wall 33 when the vane is in its full line position. The leading face of vane 35 abuts against face 34, and is stopped thereby, when the vane reaches its dotted line position. The end walls 33 and 34 being at right angles permits the vane 35 to swing through a quarter turn, or ninety degrees. Rotation of vane 35 from full to dotted-line position operates to turn valve 11 from open to closed position.

The motor cavity 26 is in the fluid line 40, which is connected to the motor body 25, 27, 28 at the inlet end of cavity 26 by coupling 41, and at the exhaust end of cavity 26 by coupling 42. Fluid of line 40 enters the cavity 26 through coupling 41 and through inlet port 43, and the fluid flows out of the cavity 26 through exhaust port 44 and the outlet coupling 42. Thus, the cavity 26 constitutes a passage in fluid line 40 through motor 12.

Opposite side walls of cavity 26, provided by respective side panels 27 and 28, extend normal to the common axis the bearings for pintles 36 and 37. Rectangular vane 35 comprises side edges between its leading and trailing faces, and the side walls of panels 27 and 28 are positioned, each for fluid-tight proximity with its corresponding side edge of vane 35, as seen in Fig. 3.

The cavity 26 comprises the arcuate wall 45 along which the peripheral or end edge of the vane 35 sweeps in its movement between its extreme positions against respective end walls 33 and 34. In the disclosed embodiment, the end edge of vane 35 is square with reference to the opposite side edges, as seen in Fig. 3. Spanwise between the side walls of cavity 26 provided by panels 27 and 28, arcuate wall 45 is contoured to match the end edge of vane 35, and the arcuate wall is positioned for fluid-confining proximity with the end edge of the vane, as seen in Fig. 3.

The inlet port 43 is through the end wall 33, and is positioned to direct fluid flow against the trailing face of vane 35. Thus, fluid entering the cavity 26 drives vane 35 before it towards the opposite end wall 34. The exhaust port 44 is through the arcuate wall 45, and is positioned along the arcuate wall adjacent to vane 35 when the vane is in position against the end wall 34. The exhaust port 44 is therefore within the fluid passage of the cavity 26 adjacent to vane 35 when the vane is at its second extreme position. When fluid flows through line 40, it causes the gate 35 to make a quarter turn on the axis of its trunnion 36, 37.

The cavity 26 is sealed along the bearing of pintle 37 by means of the packing 38.

The flow of fluid through line 40 is instituted by means of a valve, not shown, which may be any suitable ON-and-OFF valve similar to the valve 11, which is located along the line 40 to the left of the coupling 41 in Fig. 2.

The motor 12 is rigidly secured to the valve 11 by means of screws 48 which penetrate through the panels 25, 27 and 28 into the boss 49, which is integral with the valve body 18 as illustrated in Fig. 3. The screw 50 penetrates through the back panel 27 into boss 49 as seen in Fig. 3, to constitute a fourth securing screw between the bodies 18 and 25, 27, 28. The two bodies 18 and 25, 27, 28 of valve 11 and motor 12, respectively, are secured to each other by means of screws 48 and 50 to locate the bodies to position the trunnion 36, 37 and valve stem 40 in coaxial alignment. The pintle 37 and the valve stem 20 comprise companion keys 51, Fig. 3, by means of which or in any other suitable manner the rotors of the valve and motor 11 and 12, respectively, are coupled to each other to rotate in unison.

Whenever the fuel valve 11 is opened by means of handle 19 for the flow of fuel through line 15, to an internal-combustion engine for example, the gate or vane 35 is swung on the axis of trunnion 36, 37 into position against the end wall 33 of the cavity 26, and the inlet port 41 is thereby directed against the trailing face of vane 35. When a condition arises making it desirable to deliver fluid through the line 40, for example if a fire breaks out in or at the internal-combustion engine making it desirable to direct fire-extinguishing fluid to the fire, the gate 35 is actuated from its first extreme position against the end wall 33 to its second extreme position against the end wall 34, by the flow of fluid in line 40 being instituted in any suitable manner. The gate 35 thus makes a quarter turn, as also the valve stem 20, and the fuel supply of line 15 accordingly is shut off. The motor 12 thus operates to shut off the fuel supply of line 15 automatically whenever the line 40 of fire-extinguishing fluid is turned on for the purpose of extinguishing a fire.

The structure shown in the drawing is one practical embodiment of the invention, which is not limited to the specific structure that is shown.

I claim:

For operating a valve with a quarter turn of its stem between open and closed positions, a motor comprising a rotor and a body forming a cavity to contain the rotor, the body comprising inlet and outlet ends defining respective extreme positions of movement of the rotor in the cavity, the rotor comprising a pintle and a rectangular vane projecting away from the pintle in a plane of its axis, the vane comprising opposite leading and trailing faces and comprising opposite side edges between the faces each extending normal to the axis of the pintle, the body comprising a bearing for the pintle and comprising opposite side walls extending normal to the axis of the bearing in position of fluid-confining proximity with respective opposite side edges of the vane in all its positions, the cavity comprising end walls spanning the space between the side walls and constituting a wall at the inlet end of the cavity and a wall at the outlet end of the cavity, the end wall at the inlet end of the cavity being contoured to match and bear against the trailing face of the vane positioned in contact therewith at one extreme position of its movement, the wall at the outlet end of the cavity being positioned to engage the leading face of the vane at the opposite extreme position of its movement, the several end walls of the cavity being relatively positioned to limit rotation of the vane on the bearing through an arc of ninety degrees, the vane comprising an end edge remote from the axis of the pintle and extending from side edge to side edge of the vane, the cavity comprising an arcuate wall spanning the space between side walls and extending from end wall to end wall, the arcuate wall being contoured to match the end edge of the vane for fluid-confining proximity with the end edge along its path of travel between extreme positions of movement of the vane in the cavity, an inlet port and an exhaust port for a stream of fluid through the cavity of the body, the inlet port being through the end wall at the inlet end of the cavity positioned to direct the stream of fluid to impinge against the trailing face of the vane, the exhaust port being in the arcuate wall located along the wall in position adjacent to the vane when the leading face of the vane engages the end wall at the exhaust end of the cavity, the pintle comprising a key to engage the stem of a valve end-to-end for rotation in unison therewith.

References Cited in the file of this patent

UNITED STATES PATENTS

| | | |
|---|---|---|
| 46,800 | Isbell | Mar. 14, 1865 |
| 434,386 | Frizell | Aug. 12, 1890 |
| 803,338 | Haas | Oct. 31, 1905 |
| 875,101 | Peregrine | Dec. 31, 1907 |
| 948,648 | Hartman | Feb. 8, 1910 |
| 1,270,722 | Gillette | June 25, 1918 |
| 1,312,839 | Dembawsky | Aug. 12, 1919 |
| 1,768,764 | Hitchcock | July 1, 1930 |
| 2,071,095 | Watts | Feb. 16, 1937 |
| 2,152,651 | Kinzie et al. | Apr. 4, 1939 |
| 2,227,767 | Smith | Jan. 7, 1941 |
| 2,313,177 | Sprague | Mar. 9, 1943 |
| 2,404,262 | Whitfield | July 16, 1946 |